Oct. 2, 1962  L. S. HAYWARD ETAL  3,056,435
WIREBOUND BOX ASSEMBLING AND CLOSING MACHINE
Filed Dec. 8, 1958  8 Sheets-Sheet 2

INVENTORS.
L. Stanley Hayward
David G. Kingsley
BY Nicholas Horvath
Curtis, Morris & Safford
ATTORNEYS.

Oct. 2, 1962 L. S. HAYWARD ETAL 3,056,435
WIREBOUND BOX ASSEMBLING AND CLOSING MACHINE
Filed Dec. 8, 1958 8 Sheets-Sheet 7

Fig. 14

INVENTORS.
L. Stanley Hayward
David G. Kingsley
Nicholas Horvath
BY Curtis, Morris & Safford
ATTORNEYS.

Fig. 15

United States Patent Office 3,056,435
Patented Oct. 2, 1962

3,056,435
WIREBOUND BOX ASSEMBLING AND CLOSING MACHINE
Leroy Stanley Hayward, Morris Plains, David G. Kingsley, Mountain Lakes, and Nicholas Horvath, Rockaway, N.J., assignors to Stapling Machines Co., Rockaway, N.J., a corporation of Delaware
Filed Dec. 8, 1958, Ser. No. 778,846
13 Claims. (Cl. 140—93)

This invention relates to machines for assembling and closing wirebound boxes (the term "boxes" being used herein to include crates and other types of wirebound containers), particularly boxes of the type wherein the box ends are provided with battens which abut the inner faces of the cleats at the edge portions of the box sides and wherein the box ends are secured to the box sides by staples driven through the cleats and/or face material of the box sides and into the battens on the box ends.

One of the most common applications for boxes of this type is in packaging relatively large and heavy equipment, such as major household appliances, plumbing fixtures, industrial equipment, and the like. The wirebound boxes for such equipment are usually of the "vertical" type—i.e., the box stands on one of its ends, which is in the form of a skid base on which the contents of the box are supported, and to which the contents may be attached, as by bolting. The box sides, which are in the form of a conventional wirebound box or crate blank, the four sections or sides of which are foldably secured together by the binding wires, are wrapped around the fixture with the cleats at the lower end of the box blank abutting the battens at the edge portions of the lower end or base and with interengageable loop fasteners at opposite ends of each binding wire coming into opposition with one another at one vertical corner of the box.

The box assembling and closing machine provided by the present invention is adapted to receive and support the boxes with the box ends in place but not secured, and with the loop fasteners threaded one through the other but not bent into interlocking engagement, to straighten and square the box, drive staples through the cleats on the box sides and into the battens on the box ends, bend the loops at the closing corner of the box, and deliver the thus assembled and closed box out of the machine. This machine is thoroughly practical and reliable in operation. Moreover, it is adapted to handle boxes of a number of different sizes and shapes, having a single, manually operable selector switch which controls the movement of the various adjustable elements of the machine to various combinations of pre-set positions for accommodating the several sizes and shapes of boxes to be handled by the machine.

Types of Containers Handled and Operations Performed by Machine

Figures 3, 16, 17:
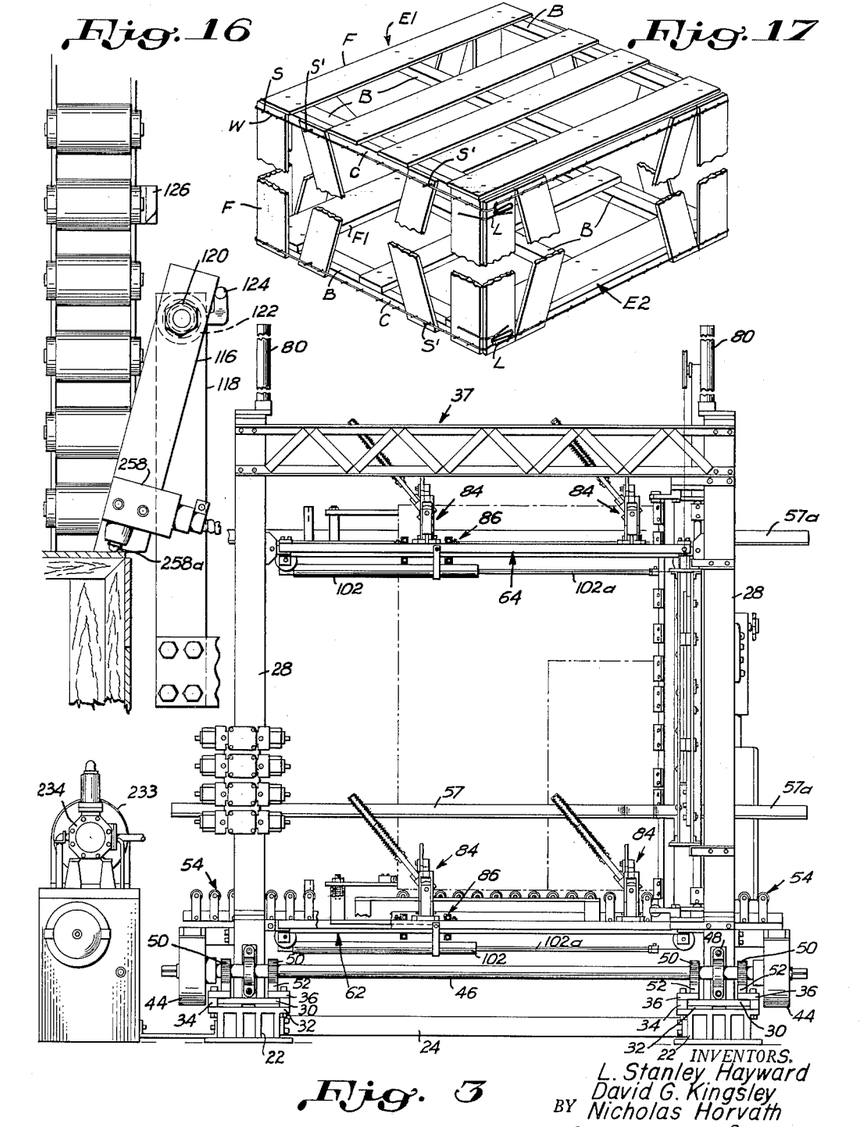
FIGURE 3 is a more or less diagrammatic elevational view of the side of the machine which appears at the left in FIGURE 1.
FIGURE 16 is an enlarged fragmentary top plan view of the right rear clamping member shown in FIGURE 2.
FIGURE 17 is a fragmentary perspective view of a fully assembled and closed wirebound crate of a type which may be handled in the machine of FIGURES 1–16.

The illustrative machine shown in the accompanying drawings is adapted for the assembly and closure of crates of the general type shown in FIGURE 17. These crates are formed from crate blanks having four sections or sides, each composed of face material or slats F and cleats C, with the four box sections foldably secured together by binding wires W which are secured to the several sections by staples S driven astride the binding wires W, through the face material or slats F and into the cleats C. The upper end section E1 is formed of face material or slats F stapled to battens B, the outer faces of the battens being positioned to abut the inner faces of the cleats C at the upper end of the crate section. The lower end section E2 is formed of heavier face material F1 stapled to battens B to form a skid base on which the contents of the box may be supported.

As mentioned hereinabove, the box enters the assembling and closing machine in an upright position as illustrated in FIGURE 17, with the contents of the box resting on its lower end E2 and with the four sides, which are in the form of a foldable crate blank, wrapped around the contents so that the cleats C at the lower edges of the sides abut the outer faces of the battens B on the lower end E2. The loop fasteners L at the closing corner of the box are threaded one into the other but not bent into the final interlocking position in which they are shown in FIGURE 17. The upper end E1 is placed on top of the crate with the battens B abutting the inner faces of the cleats C at the upper edges of the crate sides.

In the machine described hereinafter, the crate is first securely clamped in position and is squared and straightened; then long staples S are driven astride the binding wires W, through the face material or slats F and cleats C of the sides, and into the battens B on the ends E and E1 to secure the ends in position. Then the threaded loop fasteners L at the closing corner of the crate are bent into interlocking position to close the crate, and the crate is delivered out of the machine. All of the foregoing operations are accomplished automatically in proper sequence.

General Organization of Machine

Figure 1:
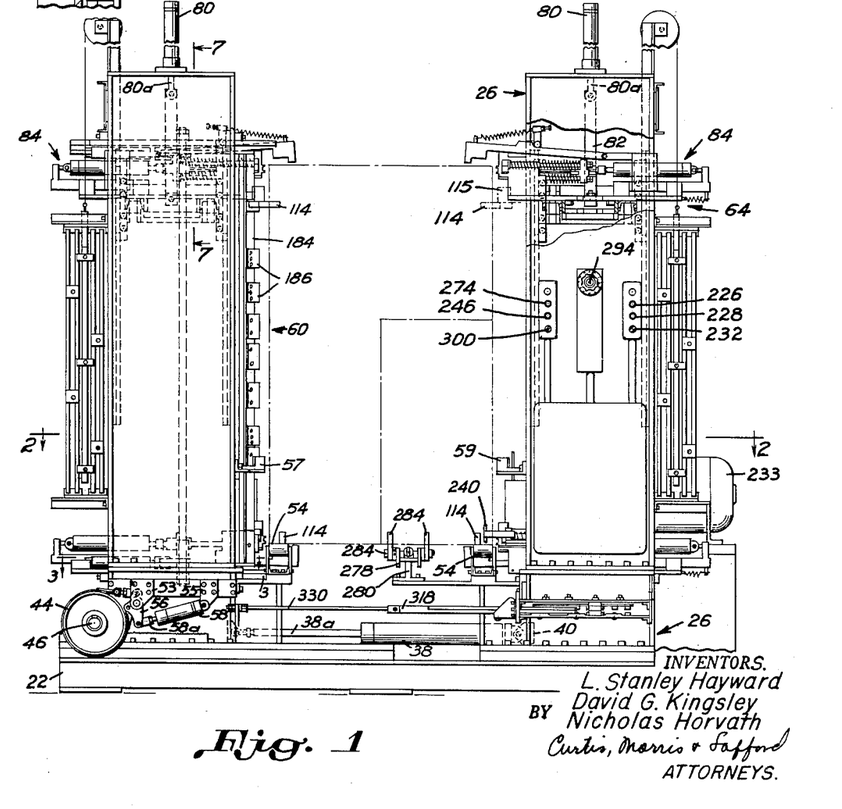
FIGURE 1 is a more or less diagrammatic elevational view of the input end of a machine embodying principles of the invention, with the positions of boxes of various heights and widths being outlined by broken lines.

The general arrangement of the machine can best be described with reference to FIGURES 1, 2, and 3. As shown in FIGURES 1 and 3, the entire machine rests upon a pair of transversely extending composite girders 22 spaced apart by stretchers 24 (FIGURE 3). A total of four columns 26 and 28 project upwardly two from each of these two girders 22. The two right-hand columns 26, as viewed in FIGURE 1, are fixed in position on their respective girders 22, while the left-hand columns 28 are supported for movement toward and away from the fixed columns 26 on flanges 30 (FIGURE 3) which are slidably supported on rails 32 at the upper surfaces of the girders 22. The flanges are guided laterally by spacer bars 34, which engage the edges of the rails 32 and girders 22 and are held against the rails 32 by retainer strips 36 which extend inwardly above the flanges 30, to prevent tipping of the movable columns 28. The two movable columns 28 are interconnected at their upper ends by a composite truss 37 (FIGURE 3), and the two fixed columns 26 are similarly braced.

Transverse movement of the movable columns 28 is effected by hydraulic cylinders 38 (FIGURES 1 and 2), the casings of these cylinders 38 being secured to the fixed columns 26 by brackets 40 (FIGURE 1) and their piston rods 38a being secured to the movable columns 28 by brackets 42. The movable columns 28 are locked in the desired position by a pair of brakes 44 at the front and rear of the machine, the drums of these brakes being fixed at opposite ends of a brake shaft 46 which extends longitudinally of the machine and is rotatably supported by pillow blocks 48 (FIGURES 2 and 3) secured to the outer faces of the two movable columns 28. Also fixed on the brake shaft 46 are four pinions 50, one at each side of each of the two movable columns 28, these pinions respectively meshing with four racks 52, each secured along the upper face of one of the retainer strips 36. Thus, as the movable columns 28 are moved transversely of the machine toward or away from the fixed column 26, the brake shaft 46 is rotated by the pinions 50 and racks 52.

As shown in FIGURE 1, the band of the brake 44 is secured at one end of a bracket 53 and at the other end to one end of a bell crank 56, which is pivoted on the bracket 53 and whose other end is pivotally attached to the piston rod 58a of a hydraulic cylinder 58, the casing of which is secured to a bracket 55 on the movable column 28. Thus, actuation of the hydraulic cylinder 58 causes the band of the brake 44 either to be tightened about the drum or relaxed, locking or unlocking the brake shaft 46 and either locking the movable columns 28 in position or freeing them for transverse movement toward or away from the fixed columns 26.

The crates are supported in the machine on two sets of rollers 54, one of which is secured to the inner faces of the two fixed columns 26 and the other of which is secured to the inner faces of the two movable columns 28. These sets of rollers 54 are adapted to engage and support the lateral edge portions of the lower end of the crate.

The crates are laterally guided through the machine by a pair of side rails 57 and 59 which are respectively secured to the inner faces of the two pairs of columns 26 and 28 respectively. Since one of the two sets of rollers 54 and the side rail 57 are attached to the movable columns 28, they move with these columns toward and away from the fixed columns 26 to adapt the machine to handle crates of different widths. Thus, regardless of the size of the crate being handled in the machine, the rollers 54 are always properly positioned beneath the edge portions of the bottom of the crate and the side rails 57 and 59 always engage the sides of the crate to support and guide it properly through the machine.

Figures 2, 4:
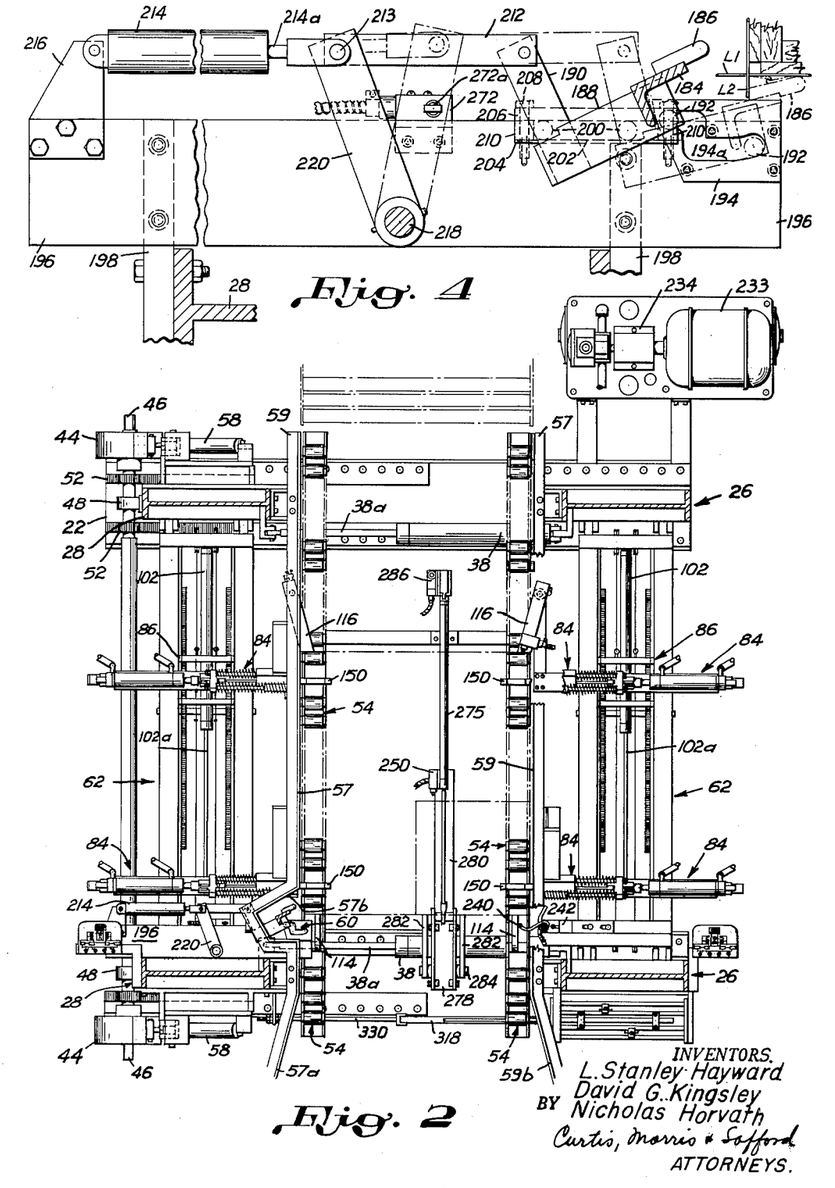
FIGURE 2 is a horizontal sectional view, taken on the line 2—2 of FIGURE 1.
FIGURE 4 is an enlarged, fragmentary horizontal sectional view taken on the line 4—4 of FIGURE 1, showing the loop bending mechanism.

As best shown in FIGURE 2, the left-hand side rail 57 is provided with a recessed portion 57b to receive the loop bending mechanism, generally designated 60, which will be described more particularly hereinafter, and the forward ends of both guide rails are provided with outwardly flared portions 57a and 59a to direct the crates between the two guide rails and into proper position transversely of the machine.

Figure 7:
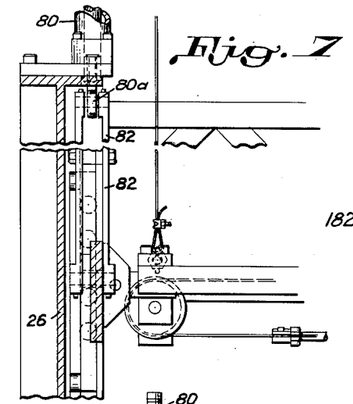
FIGURE 7 is an enlarged, fragmentary vertical sectional view taken on the line 7—7 of FIGURE 1, showing the linkage between the upper guideway and one of the hydraulic cylinders which actuate it.

Extending between the two movable columns 28 are a fixed lower guideway assembly generally designated 62 (FIGURE 2), and a vertically movable upper guideway 64. A similar pair of guideways extends between the two fixed columns 26. One of the upper guideways 64 is shown in greater detail in FIGURES 5, 6, and 7. As may be seen in these figures, the upper guideways include a pair of longitudinal framing members 66 spaced apart by transverse framing members 68 at each end. A yoke 70 is pivotally attached to each end of the guideway 64 by pins 72. Secured to each end of the yoke 70 is a vertical bar 74, on the outer sides of which are rotatably mounted a group of rollers 76 which engage channels 78 secured to the columns 26 or 28 to guide the vertical movement of the guideways 64.

The guideways 64 are actuated by means of hydraulic cylinders 80 (FIGURES 1, 3, and 7), the casings of which are secured to and project upwardly from the upper ends of the columns 26 and 28, and the piston rods 80a of which are pivotally secured to the upper ends of links 82 (see particularly FIGURE 7), which are pivotally secured at their lower ends to the yokes 70 at each end of each of the movable guideways 64. By actuation of the cylinders 80 the guideways 64 may thus be moved upwardly or downwardly to accommodate crates of different height.

Supported on each of the four guideways 62 and 64 are two stapling mechanisms generally designated 84. The stapling mechanism 84 nearer the front of the machine on each of the guideways is fixed against horizontal movement on the framing members 66, while the stapling mechanism nearest the rear or output end of the machine is mounted for movement longitudinally of the machine on a support assembly generally designated 86.

Figures 5, 6:
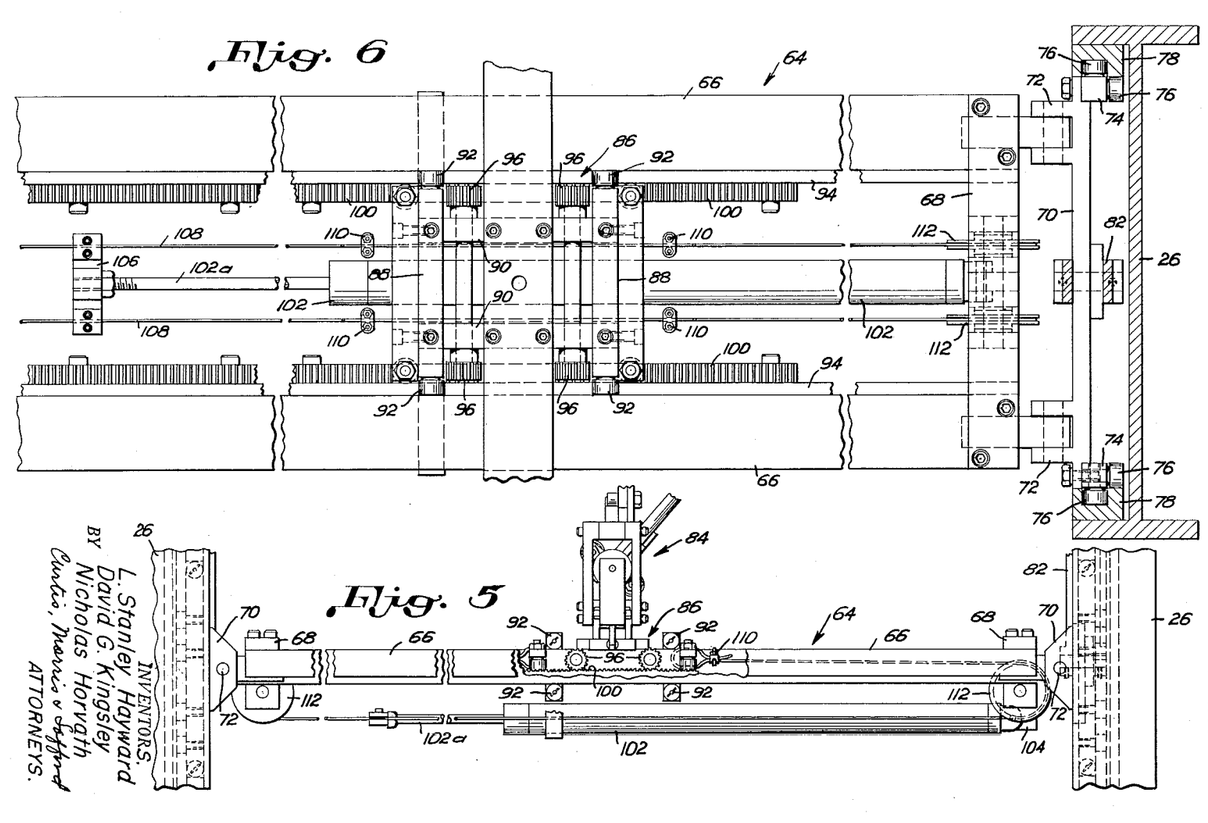
FIGURE 5 is an enlarged fragmentary side elevational view of one of the guideways, as viewed from the side of the machine which appears at the right in FIGURE 1.
FIGURE 6 is an enlarged, fragmentary top plan view of the guideway shown in FIGURE 5.

One of these support assemblies 86 is shown in detail in FIGURES 5 and 6. As may be seen in these figures, it is formed of transverse framing members 88 spaced apart by longitudinal framing members 90. The support assembly is guided against tipping movement in a vertical plane by means of rollers 92 rotatably supported at each end of each of the four transverse framing members 88, these rollers 92 respectively engaging the upper and lower surfaces of rails 94 which are secured at the inner faces of the longitudinal framing members 66 of the guideway 64. To prevent yawing movement of the support assembly 86 in a horizontal plane, pinions 96 are fixed at each end of shafts 98 which extend transversely of the support assembly 86 and are rotatably supported in the longitudinal framing members 90, these pinions 96 meshing with racks 100 which are secured to the inner faces of the rails 94. This insures that the two sides of the support assembly will move at the same speed and the support assembly will accordingly move in a straight line, parallel to the longitudinal axis of the guideway 64.

Movement of the support assembly 86 along the guideway 64 is effected by a hydraulic cylinder 102, the casing of which is pivotally attached to a bracket 104 at one end of the guideway and the piston rod 102a, which is connected by means of a clamping yoke 106 to a pair of cables 108. The two ends of each of these cables 108 are wrapped around transverse framing members at opposite ends of the support assembly 86 and secured by clamps 110. Each of these cables 108 is trained about a pair of pulleys 112, which are rotatably supported at opposite ends of the guideway 64. It will thus be seen that the actuation of the cylinder 102 causes movement of the support assembly 86 longitudinally of the guideway 64. Thus the positions of the rear stapling mechanism 84 can be adjusted to accommodate crates of different fore-and-aft dimensions.

*Clamping Mechanism*

As may be seen in FIGURES 1 and 2, a set of four stop members 114 are mounted near the input end of the machine for respective engagement with the four corners of the trailing side of the crate. Each of these stop members is merely an elongated bar. The lower pair of stop members 114 are mounted at the inner faces of the two sets of rollers 54 for rocking movement in a vertical plane about pivots located near their forward ends. The upper pair are mounted on brackets 115 secured to the upper guideways 64 for rocking movement in a horizontal plane about pivots near their forward ends. The stop members are all spring-loaded so that their rear ends normally project into the path of the four respective corners of the crates, which are outlined in broken lines in FIGURE 1.

As each crate moves into the machine on the rollers 54, its lower corners engage the inclined inner edges of the stop members 114 and cam the stop members outwardly about their pivots against the resistance of the biasing springs, to the point where the stop members clear the sides of the crate. Then, when the trailing side of the crate passes the rearward ends of the stop members 114, the springs rock the stop members 114 again to their inner position, in which they are shown in full lines in FIGURE 1.

For cooperation with the stop members 114, there are provided, as shown in FIGURE 2, four clamp members 116 which are pivotally mounted on arms 118 projecting rearwardly from the four movable support assemblies 86, respectively supported on the guideways 62 and 64. One of these clamp members is shown at enlarged scale in FIGURE 16. As may be seen in that figure, the clamp member is pivoted on a bolt 120 at the rear end of the arm 118 and is urged to rotate in a clockwise direction, as viewed in FIGURE 16, about the bolt 120 by means of a coil spring 122 which encircles the bolt. Clockwise movement of the clamp member 116 under the influence of the spring 122 is limited by a stop finger 124 which projects outwardly and upwardly from the arm 118. The clamp member thus normally occupies the position in which it is shown in FIGURE 16, at which position its forward end projects into the path of one of the corners of the crate as it moves into the machine. As the movable support assemblies 86 are moved toward the front or input end of the machine by the cylinders 102, as previously described, the clamp members 116 engage the leading corners of the crate and push the crate rearwardly against the stop members 114, thus squaring the crate and clamping it firmly in position for the staple driving and loop bending operations.

After these operations have been completed, and as the movable support assemblies 86 are again moved rearwardly in the machine, the inclined inner edges of the clamp members 116 engage cam blocks 126 (FIGURES 2 and 16), camming the clamp members outwardly against the resistance of the springs 122 until their forward ends have cleared the leading corners of the crate, thus permitting the crate to be ejected from the machine.

*Stapling Mechanism*

As previously mentioned, the machine includes a total of eight stapling units 84, two mounted on each of the two fixed lower guideways 62 and two mounted on each of the two upper guideways 64. As was also previously mentioned, the forward one of each of the two stapling units on each guideway is fixed in a position while the rear one is mounted longitudinally of the guideway on the support assembly 86. The forward stapling unit is positioned rearwardly of the stop members 114 (FIGURE 2) by such distance that the staple driven thereby is spaced from the trailing corner of the box blank by the proper distance. Since there is also a fixed spatial relation between the rear stapling mechanisms 84 and the clamping members 116, the staple driven by this stapling unit is likewise properly spaced from the leading corner of the box blank.

Figure 10:
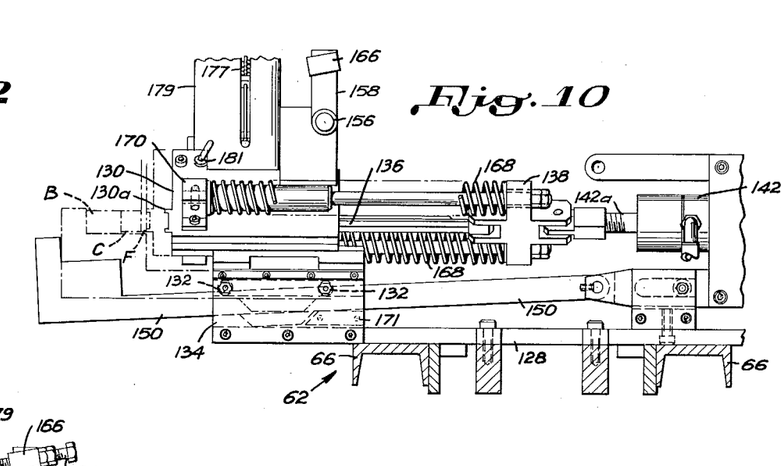
FIGURE 10 is a fragmentary side elevational view of one of the lower stapling mechanisms equipped with a support hook for supporting the batten on the lower box end during the driving of staples therein.
Figure 11:
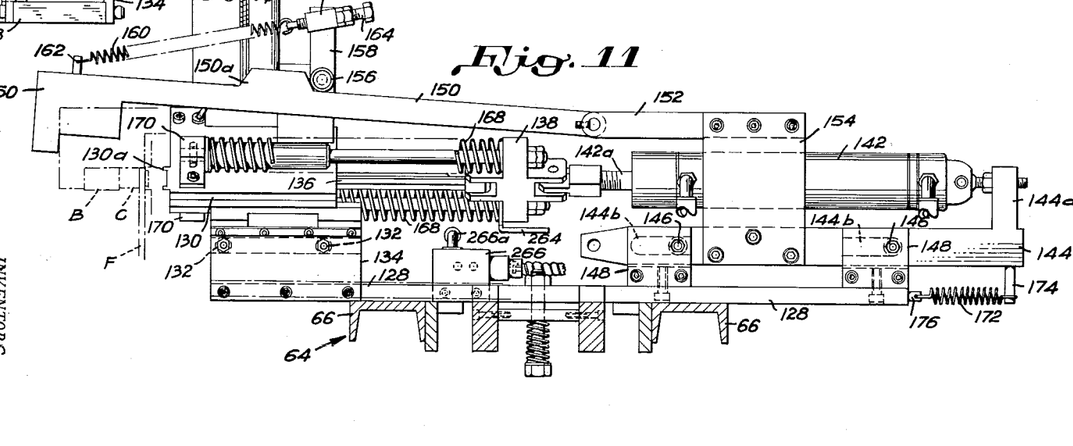
FIGURE 11 is a similar view of one of the upper stapling mechanisms which is yieldably mounted to permit its support hook properly to locate the stapler vertically relative to the upper end of the box.
Figure 12:
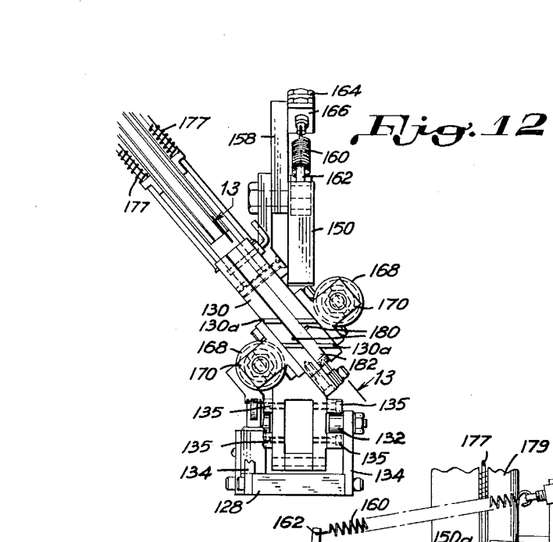
FIGURE 12 is a front end view of the upper stapler shown in FIGURE 11.
Figure 13:
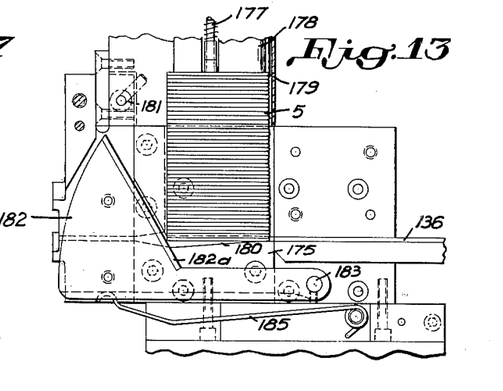
FIGURE 13 is an enlarged sectional view taken on the line 13—13 of FIGURE 12 showing means for supporting the staples as they are being driven.

The construction of the stapling unit is shown in detail in FIGURES 10–13. FIGURE 10 shows the forward stapling unit on one of the fixed lower guideways 62, while FIGURES 11–13 show the forward stapling unit on one of the movable upper guideways 64. These two types of stapling units are generally similar except for the arrangement of the support hooks which back up the battens on the crate ends during the staple driving operation. Each stapling unit is mounted on a base plate 128 which, in the case of the forward stapling units, is adjustably secured to the longitudinal framing members 66 of the guideways 62 or 64, and in the case of the rearward stapling units is fixed on the movable support assemblies 86 (see FIGURE 2). The body 130 of each of the stapling mechanisms is supported for movement toward and away from the work by rollers 132 which are rotatably mounted at the inner faces of side plates 134 which project upwardly from either side of the inner end of the base plate 128, these rollers 132 being received between guide rails 135 (FIGURE 12) which are secured to the base portions of the body 130. The staple driver 136 of the stapling unit is pivotally attached at its outer end to a yoke 138 which in turn is pivotally attached to the piston rod 142a of a hydraulic cylinder 142. The casing of the cylinder 142 is pivotally secured at its outer end to an arm 144a, projecting upwardly from a slide 144 which is supported for movement along the base plate 128 by rollers 146 which are rotatably mounted on blocks 148 projecting upwardly from opposite sides of the base plate 128, and which are received in slots 144b in the sides of the slide 144.

In the lower stapling units, as shown in FIGURE 10, the support hook 150 is mounted beneath the stapling mechanism and is pivotally supported at its outer end on the forward end of the slide 144. The weight of the support hooks 150 normally maintains them in the position in which they are shown in full lines, at which a projection 150a on the bottom of the hook rests on base plate 128. In this position, the uppermost part of the inner end of the hook is below the path of the crate as it moves into the machine.

In the upper stapling mechanisms, as shown in FIGURE 11, the support hook 150 is mounted above the stapling mechanism and is pivotally supported at its outer end on the inner end of a support block 152 which is secured at the upper ends of side plates 154 which project upwardly from opposite sides of the slide 144. The support hook 150 is normally maintained in the upper position in which it is shown in FIGURE 11, at which its upper edge bears against a roller 156, which is rotatably mounted on an arm 158 projecting upwardly from the body 130, by means of a coil spring 160 which is tensioned between a pin 162 on the upper edge of the support hook 150 near its inner end and a bolt 164 which is adjustably threaded through a block 166 at the upper end of the arm 158. Thus the hook 150 is elevated above the path of the crate as it moves into the machine.

The driver 136 of the stapling mechanism is normally maintained in a retracted position, in which it is shown in FIGURES 10 and 11, by a pair of heavy compression springs 168 which are interposed between the yoke 138 and blocks 170 projecting from each side of the body 130. The slide 144 is normally maintained in the inner position in which it is shown in FIGURES 10 and 11 by a lighter tension spring 172, one end of which is hooked around a pin 174 depending from the outer end of the slide 144 and the other end of which is hooked through a pin 176 projecting from the outer end of the base plate 128. Inward movement of the slide 144 under the influence of the spring 172 is limited by engagement of the rearward pair of rollers 146 with the ends of the slots 144b in which they are received.

As hydraulic fluid is supplied under pressure to the cylinders 142, three operations occur in sequence. First, the piston rod 142a moves to the left, as viewed in FIGURES 10 and 11, moving the body 130 of the stapling mechanism inwardly until a pair of ridges 130a on the inner face of the body 130 engage the face material on the side of the crate astride the binding wire W, thus limiting further inward movement of the body 130. In the upper stapling mechanism (FIGURE 11), during this inward movement of the body 130, the roller 156 rides over a projection 150a on the upper edge of the support hook 150, camming the hook in a counterclockwise direction, as viewed in FIGURE 11, against the resistance of the spring 160, so that the hook enters behind the battens B on the upper end of the box. If the upper end is not down in proper position, the portion 150b of the hook 150 engages the upper face of the battens and presses the top end down to proper position with the battens B directly behind the cleat C on the side of the box.

Second, the casing of the cylinder 142 and the slide 144 move outwardly against the resistance of the spring 172. In the lower stapling mechanism (FIGURE 10), this outward movement of the slide 144 and support hook 150, causes the projection 150a on the lower edge of the support hook to engage a cam block 171 which is mounted between the side plates 134, swinging the support hook upwardly behind the batten B on the lower end of the crate, and preventing further outward movement of the hook 150, slide 144 and the casing of the hydraulic cylinder 142.

Third, the staple driver 136 is pushed inwardly against the resistance of the springs 168, causing a staple to be driven astride the binding wire W, through the face material F and the cleat C of the crate and into the batten B on the crate end. During this latter phase of the operation, the hydraulic cylinder 142 is applying substantially equal pressure to both sides of the work—that is, the force applied to the outer face of the work by driving of the staple into it is substantially equal to the force applied to the inner face of the batten B by the support hook 150. Thus, there is no tendency for the work to bow away from or be broken by the stapling mechanism.

FIGURE 13 shows the inner construction of a stapling unit. As may be seen in this figure, a clip of staples S, cemented together in edge-to-edge relation, is supported astride a support block 173 and urged downwardly against an end plate 175 by means of a compression spring 177 bearing against a follower 178 which engages the upper end of the clip. The clip is enclosed by a magazine 179 which projects upwardly from the body 130 and which is removably secured thereto by a cam lock 181.

The bottom staple in the clip is entirely clear of the lower end of the support block 173, so that this staple can be sheared from the group by the driver 136. As the staple is driven toward the work, its legs are guided in grooves 180 in which they are held by a guide member 182 which is straddled by the legs of the staple and which is pivotally mounted on a pin 183 and urged upwardly by a spring 185 so that it normally occupies the position shown in FIGURE 13. The surface 182a of the guide member 182 which faces the oncoming staple is inclined relative to the path of the staple so that the staple will cam the guide member 182 gradually downward, against the resistance of the spring 185, with the staple riding along the surface 182a as it moves out of the body 130. As may be seen in FIGURE 12, the guide member 182 fills the entire opening in the forward portion of the body 130 except for the grooves 180, which are just large enough to permit passage of the legs of the staple. Thus the staple legs are supported on all sides as the staple is driven into the work, to prevent buckling.

Loop Bending Mechanism

As mentioned previously, the loop bending mechanism 60 (FIGURES 1 and 2) is mounted on the left-front movable column 28 of the machine. As shown in detail in FIGURES 1 and 2, the loop bending mechanism 60 includes a bender bar 184 having bender blocks 186 secured thereto at appropriate positions to engage the loop fasteners at the closing corners of crates of the various sizes to be handled in the machine. As best shown in FIGURE 4, the bender bar 184 has projecting from its upper and lower ends a pair of arms 188 and 190 which are secured at right angles to each other to form a bell crank. At the outer face of the arm 188, near its inner end, there is rotatedly mounted a roller 192 which is received in a slot 194a in a cam block 194 secured to the inner face of a supporting plate 196 which is mounted on arms 198 projecting inwardly from opposite sides of the column 28. At the outer face of the arm 190, there is rotatedly mounted a roller 200 which is received in a slot 202 formed between plates 204 and 206 which are clamped by bolts 208 at opposite sides of spacers 210. The outer end of the arm 190 is pivotally attached to one end of a link 212, the opposite end of which is pivotally secured by a clevis pin 213 to the piston rod 214a of a hydraulic cylinder 214, the casing of which is pivotally secured to a bracket 216 projecting from the plate 196. There is a hydraulic cylinder 214 at each end of the bender bar 184, and to insure their operation in synchronism they are linked together by a torque bar 218, the ends of which are journaled in the plates 196, and which has projecting near its opposite ends crank arms 220, which are also pivotally connected to the piston rods 214a of the respective hydraulic cylinders 214 by the clevis pins 213.

The piston rod 214a of each hydraulic cylinder 214 is normally in the retracted position in which it is shown in full lines in FIGURE 4. Thus, the link 212 is in its outer position, 192 and 200 are at the extreme outer ends of their respective slots 194a and 202, and the bender blocks 186 are in the position shown in full lines, to the left of and slightly to the rear of the loops L1 which project leftward from the closing corner of the box.

When hydraulic fluid is supplied under pressure to the cylinder 214, the piston rod 214a is forced toward the right, to the position indicated in broken lines, pushing the link 212 to the right and forcing the rollers 192 and 200 to the inner ends of their respective slots. The slot 194a is irregular in shape, extending first inwardly of the machine, then forwardly, again inwardly, and finally slightly rearwardly. Thus, the bender blocks 186 move first inwardly toward the box at a point behind the loops L1, then sweep forwardly, engaging the loops L1 and bending them forward. Then the bender blocks again move inwardly of the machine, bending the loops L2 down against the front of the box and bending the loops L1 around them. Finally, the bender blocks 186 move slightly rearwardly, bending the loops L1 down against the side of the crate, completing the closure. Pressure fluid is then supplied to the hydraulic cylinder 214 on the opposite side of the piston to withdraw the piston rod 214a and return the bender bar to the retracted position shown in full lines in FIGURE 4.

Control Circuit and Sequence of Operation

Figure 14:
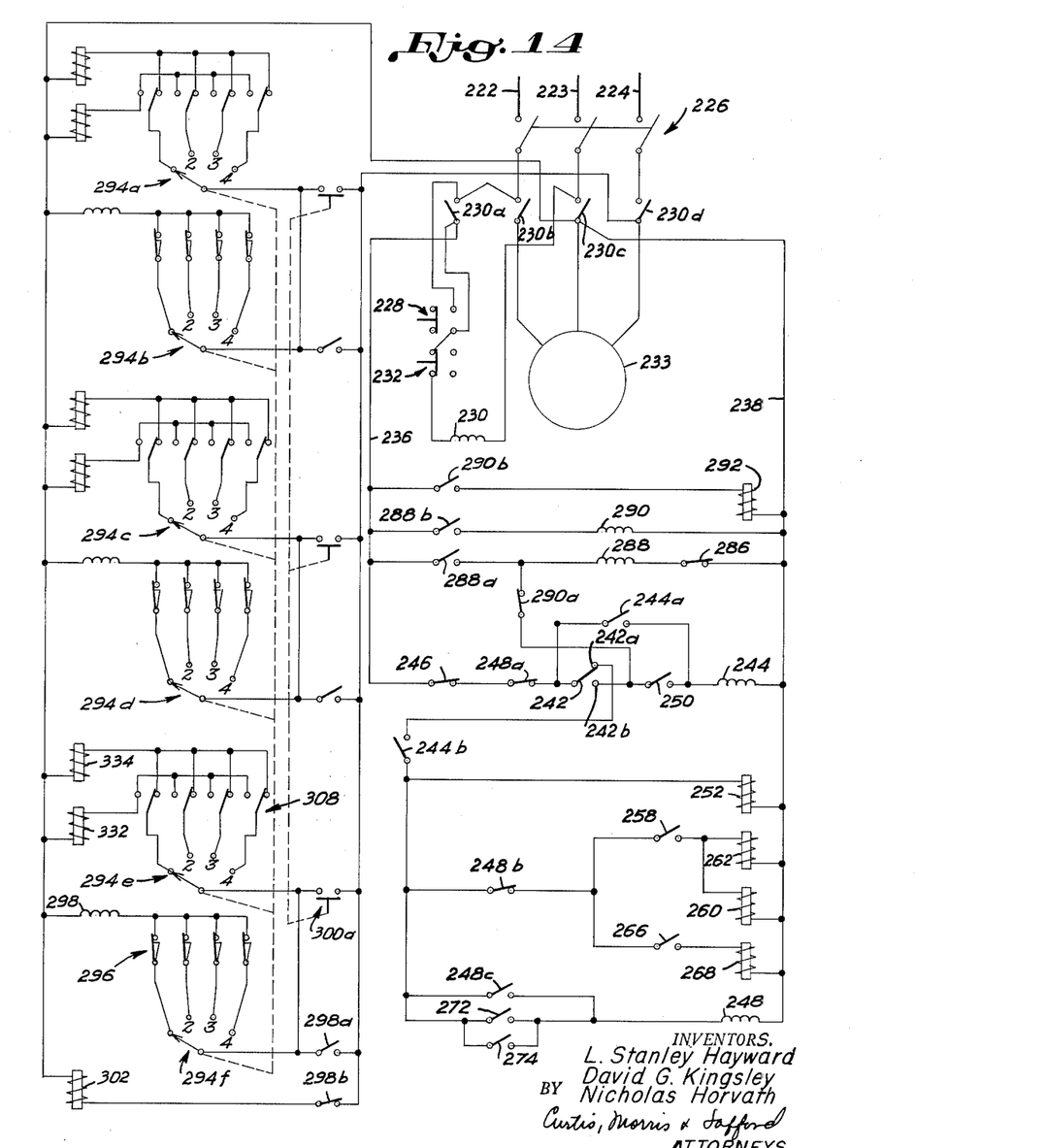
FIGURE 14 is a schematic diagram of the electrical circuit of the machine.

FIGURE 14 is a schematic diagram of the electrical circuit which controls the operation of the various elements of the machine. The wires 222, 223, and 224 appearing at the upper right-hand corner of FIGURE 14 are connected to a source of three-phase alternating current electrical power. The "disconnect" switch 226, the "start" switch 228, and the "stop" switch 232, which appear on the upper right-hand quadrant of FIGURE 1, are manually operated push-button switches which are mounted on the right front fixed column 26 (FIGURE 1) of the machine, together with the other manually operated switches which control the machine.

As may be seen in FIGURE 14, when the disconnect switch 226 is closed and the normally open start switch 228 is depressed, the two wires 222 and 223 are connected across the winding of a "start" relay 230 through the normally closed contacts of the stop switch 232. The energization of the relay 230 closes its contacts 230a, which are holding contacts connected in parallel with the contacts of the start switch 228, and which complete the circuit to the winding of the relay 230 to maintain its energization even after the momentary contact start switch 228 has been released. The energization of relay 230 also closes its contacts 230b, c, and d, which connect the power lines 222, 223, and 224 to the electric motor 233 which drives the hydraulic pump 234 (FIGURES 2 and 3). It also connects the lines 223 and 224 to a pair of power lines 236 and 238 respectively, through which power is supplied to the other portions of the circuit. The machine is now ready to receive a crate.

As the crate, with its ends in place and with its loops threaded but not bent into interlocking engagement, enters the machine, for example, on a gravity conveyor, it rides along the rollers 54 and its right-hand vertical leading edge engages a finger 240 (FIGURES 1 and 2), which is positioned just above the right-hand set of rollers 54, rocking the finger in a clockwise direction as viewed in FIGURE 2 and depressing the plunger of a "run" switch 242. This "run" switch 242, which is also shown in FIGURE 14, is a momentary contact, single-pole double-throw switch which normally is in the position indicated in FIGURE 14, at which its movable contact is in engagement with the fixed contact 242a. However, engagement of the crate with the switch actuating finger 240 (FIGURES 1 and 2), throws the movable contact into engagement with the other fixed contact 242b, energizing the winding of a "pump control" relay 288 through the normally closed contacts 290a of a "pump cutout" relay 290 and through a normally closed "pump cutout" switch 286. The energization of the pump control relay 288 closes its holding contacts 288a to maintain the energization of the relay 288 even after the momentary contact run switch 242 is released. It also closes the relay contacts 288b, energizing the pump cutout relay 290. This opens the aforementioned contacts 290a of relay 290, isolating the pump control components from the remainder of the circuit and preventing a "sneak" circuit which would maintain the relay 244 energized even after opening of the contacts 248a of the release relay 248. The energization of the pump cutout relay 290 also closes its contacts 290b, energizing the pressure control solenoid 292, which increases the hydraulic pressure developed by the pump 234 (FIGURE 15) to the level required for performance of the machine operations.

The actuation of the run switch 242, as previously described, also energizes the winding of a "run" relay 244 from the lines 236 and 238 through a normally closed "by-pass" switch 246, through the normally closed contacts 248a of the "release" relay 248, and through a "reset" switch 250, which is a momentary contact, normally open single-pole single-throw switch which is held closed at the start of the machine cycle, as will be described hereinafter. The energization of the run relay 244 closes its holding contacts 244a, which maintains the energization of the relay 244 even after the run switch 242 has been again thrown to the position shown in FIGURE 14 by passage of the crate into the machine. The energization of relay 244 also closes its contacts 244b, which energizes the clamp solenoid 252 upon the reclosure of contact 242a. As may be seen at the right-hand side of FIGURE 15, the energization of this clamp solenoid 252 causes movement of the spool of a valve 254 against the resistance of a return spring 256 and causes hydraulic fluid to be supplied from the pump 234, which is driven by the motor 233, as previously described, to the four hydraulic cylinders 102 (see also FIGURES 2, 3, 5 and 6), causing the support assemblies 86 to move forwardly along their respective guideways 62 and 64 so that clamp members 116 (FIGURES 2 and 3) engage the leading side of the crate near its four corners and press the crate back a short distance in the direction opposite to that in which it entered the machine, until the trailing side of the crate engages the stop members 114 (FIGURES 1 and 2), thereby squaring the crate and clamping it securely in the machine, in proper position for the performance of the machine operations on it.

As may be seen in FIGURE 16, mounted near the outer end of the lower right-hand clamping member 116 is a momentary contact, push-button switch 258, the plunger 258a of which is depressed when the clamp member 116 engages the leading side of the crate. As may be seen in FIGURE 14, this switch 258 is a normally open single-pole single-throw switch, the actuation of which energizes the stapler solenoids 260 through the normally closed contacts 248b of the "release" relay 248. As may be seen in FIGURE 15, the energization of these stapler solenoids 260 actuates the valves 262 to supply pressure fluid from the pump 234 to the eight hydraulic cylinders 142 (see also, FIGURES 10 and 11), which actuate the stapling mechanisms, thus causing staples to be driven into the crate to secure the crate ends, as previously described.

As the upper left-hand front staple driver 136 (FIGURE 11) completes its staple-driving stroke, a finger 264 which projects from the yoke 138 engages and depresses the plunger 266a of a momentary contact, push-button switch 266. As may be seen in FIGURE 14, this switch 266 is a normally open, single-pole, single-throw switch, the closure of which energizes the bender solenoid 268 through the normally closed contacts 248b of the release relay 248.

Figure 15:
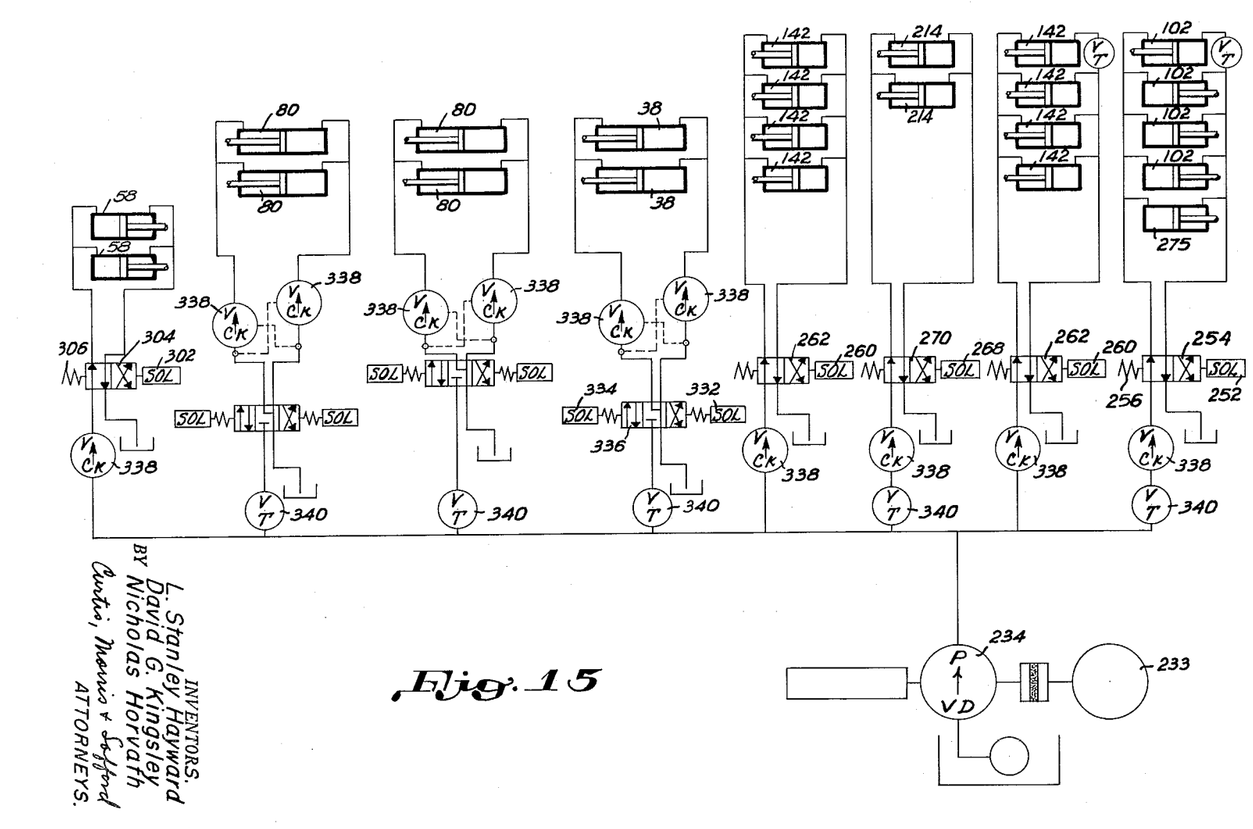
FIGURE 15 is a schematic diagram of the hydraulic circuit of the machine.

As may be seen in FIGURE 15, the energization of the bender solenoid 268 actuates the valve 270 to supply pressure fluid from the pump 234 to the hydraulic cylinders 214 (see also FIGURES 2 and 4), causing them to drive the bender bar 184 to bend the loops L1 and L2 (FIGURE 4) at the closing corner of the crate into interlocking engagement.

As the bender bar 184 completes its loop-bending stroke, the crank arm 220 (FIGURE 4) engages and depresses the plunger 272a of a momentary contact release switch 272, which is secured to the plate 196. As may be seen in FIGURE 14, this switch 272 is a normally open single-pole single-throw switch, the closure of which energizes the release relay 248, closing its normally open holding contacts 248c and completing the circuit for energization of the relay 248 even after the switch 272 is again opened by return of the bender bar to its retracted position. The energization of the release relay 248 immediately opens its normally closed contacts 248b which de-energizes solenoids 260 and 268 of valves 262 and 270 (FIGURE 15). This causes the stapling mechanism 84 and bender bar mechanism 184 to return to their original positions out of engagement with the crate. At the end of a short time interval the relay contacts 248c open de-energizing release relay 248 and opening contacts 248a which de-energizes clamp solenoid 252 of valve 254.

As may be seen at the bottom of FIGURE 14, a manually operated push button switch 274 is connected in parallel with the release switch 272 (see also FIGURE 4) which is actuated by movement of the bender bar 184 to loop bending position, so that the operator may release the crate at any stage of machine operation, for example, if one of the mechanisms fails to function properly and to initiate operation of the next successive function of the machine. As may be seen in FIGURE 1, this manually operated switch 274 is also mounted on the right-hand front column 26 of the machine together with the other manually operated switches.

As may be seen at the upper right-hand corner of FIGURE 15, a hydraulic cylinder 275 is connected in parallel with the hydraulic cylinders 102 (see also FIGURES 2, 3, 5 and 6) which move the support assemblies 86 on which the clamp members 116 are mounted. As the cylinders 102 are actuated to move the support assemblies 86 and the clamp members 116 rearwardly of the machine and out of engagement with the crate, pressure fluid is supplied to the cylinder 275 (see also FIGURE 2) to cause its piston rod 276 to retract, pulling an ejector carriage 278 rearwardly in the machine along a track 280 on which it is slidably supported.

As may be seen in FIGURES 1 and 2, a pair of ejector arms 282 are pivotally mounted at their forward ends on pins 284 which project from opposite sides of the ejector carriage 278 near its forward end. By spring means (not shown) these ejector arms 282 are yieldably urged to pivot about the pins 284 to the position at which they are shown in FIGURE 1, at which their rearward ends project upwardly into position to engage the trailing side of the crate. Thus, as the ejector carriage 278 is moved rearwardly along the track 280 by the hydraulic cylinder 275, the ejector arms 282 engage the trailing side of the crate and initiate movement of the crate out of the machine along the rollers 54. When the next crate enters the machine, the ejector arms 282 are depressed to permit the crate to pass over the ejector arms to the point where the trailing side of the crate has cleared the rearward ends of the ejector arms, at which point the arms are urged upwardly by their respective springs into position to engage the trailing side of the crate.

As the ejector carriage 278 completes its crate ejecting stroke, its leading end engages the plunger of the "reset" switch 250 (FIGURE 2), which is secured adjacent to the forward end of the hydraulic cylinder 275. As may be seen in FIGURE 14, and as previously mentioned, this reset switch 250 is a normally open single-pole single-throw switch, which is closed when its plunger is depressed by the ejector carriage 278 at the completion of the ejection cycle. Closure of the reset switch 250 readies the circuit for energization of the run relay 244 the next time the run switch 242 is thrown to close its contact 242b by arrival in the machine of the next crate to be operated upon.

As the crate is pushed out of the machine by the ejector mechanism, it passes over the roller leaf of a pump cutout switch 286 which is secured near the rearward end of the hydraulic cylinder 275 (FIGURE 2), thereby actuating the switch. As may be seen in FIGURE 14, this switch 286 is a normally closed single-pole single-throw switch, which is opened when the switch is actuated by passage of a crate out of the machine. The opening of the switch 286 de-energizes the winding of the pump control relay 288, breaking its holding 288a, and also opening up its contacts 288b and de-energizing the winding of the pump cutout relay 290. The de-energization of the relay 290 opens its contacts 290b and de-energizes the pressure control solenoid 292. This readjusts the pump 234 to idling pressure until the next crate enters the machine.

As may be seen in FIGURE 14, when the aforementioned by-pass switch 246 (FIGURE 14) is open, the run relay 244 cannot be energized, even when the switch 242 is actuated by arrival of a crate in the machine, thus actuation of the by-pass switch 246 causes the crate to pass through the machine without being operated upon. As may be seen in FIGURE 1, this manually operated by-pass switch 246 is mounted on the front right-hand column 26, together with the other manually operated switches.

*Machine Adjustment*

Also mounted on the right-hand front column 26 (FIGURE 1) are a selector switch 294 and a change switch 300. As may be seen in FIGURE 14, the selector switch 294 is a four-position, six-section rotary switch. The upper four sections 294a–d of this switch, as they appear in FIGURE 14 serve to control the vertical position of the two movable upper guideways 64 (FIGURES 2 and 3), while the two lower sections 294e and 294f control the transverse position of the two movable columns 28 (FIGURES 1, 2, and 3). The operation of only the latter two sections of the switch need be described, since the operation of the other four sections is similar.

As may be seen in FIGURE 14, the four fixed contacts of the lowermost section 294f of the selector switch 294 are respectively connected in series with four single-pole single-throw normally closed "position" switches 296, which are connected in parallel with each other and in series with the winding of a "change" relay 298. This change relay 298 has two sets of contacts 298a and 298b which appear at the bottom of FIGURE 14. The contacts 298a are normally open contacts which are connected in parallel with the normally open contacts of the lower section 300a of the change switch 300, which is a triple-pole single-throw momentary contact push-button switch. Depressing the change switch 300 closes its contacts 300a and, if the particular position switch 296 which is connected into the circuit by the selector switch section 294f is closed, it energizes the change relay 298. This closes its contacts 298a, which serve as holding contacts to maintain the relay energized after the change switch 300 has been released. Energization of the change relay 298 also opens its normally closed contacts 298b, de-energizing the brake solenoid 302.

As shown in FIGURE 15, this solenoid 302 actuates the valve 304 which controls the supply of fluid to the two hydraulic cylinders 58 (see also FIGURE 1) which operate the brakes 44. The de-energization of the solenoid 302 allows the valve 304 to be moved from the position in which it shown in FIGURE 15 to its alternate position by a return spring 306 (FIGURE 15), thus actuating the hydraulic cylinders 58 to release the brakes 44 (FIGURES 1 and 3). This frees the movable columns 28 for movement toward or away from the fixed columns 26.

The closure of the contacts 298a also supplies current through the second-from-bottom section 294e of the selector switch 294 to a selected one of four direction switches 308. These direction switches 308 are single-pole double-throw switches. Depending on the setting of the selected direction switches 308, current is supplied to either one or the other of the pair of solenoids 332 and 334. As shown in FIGURE 15, these solenoids 332 and 334 actuate the spool of a valve 336 which controls the supply of hydraulic fluid from the pump 234 to the hydraulic cylinders 38 (see also FIGURES 1, 2, and 8) which move the movable columns 28 transversely relative to the fixed columns 26. Thus, as soon as the change switch 300 is depressed, assuming that the selector switch 294 has been set for a position other than that in which the movable columns 28 are already resting, the hydraulic cylinders 58 will cause movement of the movable columns 28 in one direction or the other depending on the setting of the particular direction switch 308 which has been selected by the selector switch 294.

Figures 8, 9:
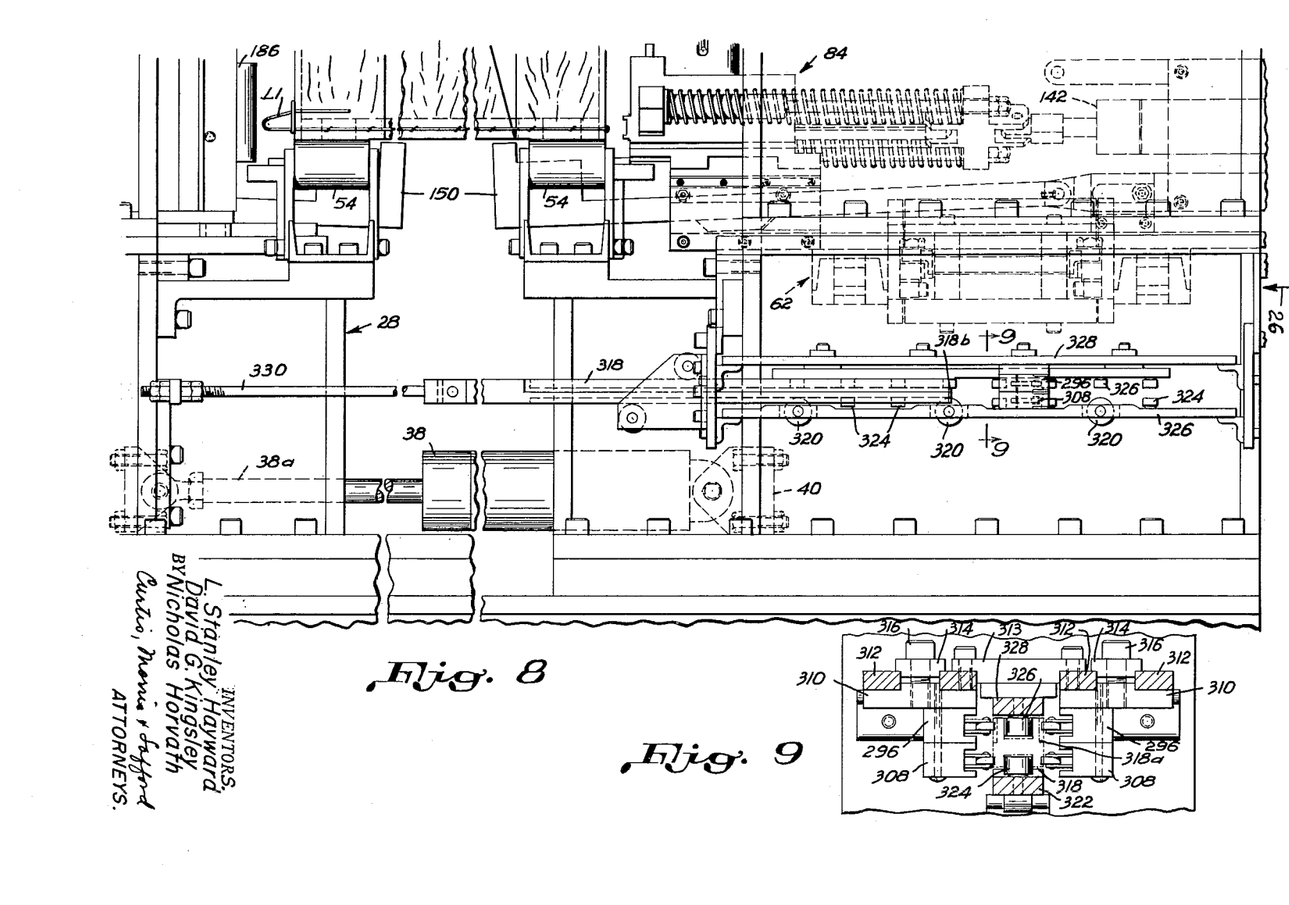
FIGURE 8 is an enlarged, fragmentary front elevational view of the lower portion of the machine in FIGURE 1, showing the mechanism for controlling the movement of the movable columns of the machine.
FIGURE 9 is an enlarged transverse sectional view taken on the line 9—9 of FIGURE 8.

As best shown in FIGURES 8 and 9, the direction switches 308 and the position switches 296 are mounted in pairs side-by-side on switch plates 310, which are adjustably clamped on rails 312 by clamp blocks 314 and bolts 316. The rollers on the plungers of the switches 296 and 308 bear against a switch actuating rod 318, which is an elongated rod of irregular but generally rectangular cross-sectional shape. It is supported for movement transversely of the machine on rollers 320 (FIGURE 8), which are rotatedly mounted in a bar 322 which is secured to the front right-hand vertical fixed column 26. The switch actuating rod 318 is guided against lateral movement by two sets of rollers 324 and 326 (FIGURE 9), which are respectively mounted on the bar 322 and on a second bar 328 and which project into slots in the switch actuating rod 318. The switch actuating rod 318 is connected by means of a tie bar 330 (FIGURE 8) with the left-hand front movable column 28 so that as the movable columns 28 move toward and away from the fixed columns 26, the switch actuating rod 318 moves longitudinally relative to the switches 296 and 308. The portion of the switch actuating rod 318 (FIGURE 9), which is opposite the direction switches 308 is of uniform thickness throughout its full length, so that if the movable columns 28 are nearer to the fixed columns 26 than is appropriate to the width of the crate to be handled in the machine, the switch actuating rod 318 will be sufficiently far to the right to engage the roller of the particular directional switch which has been selected by the selector switch section 294e. Thus, it will depress the plunger of that switch and throw the switch into such position as will energize the "apart" solenoid 334 (FIGURE 15), which will move the spool of the valve 336 in the direction for supplying fluid into the appropriate ends of the hydraulic cylinders 38 (see also FIGURE 1) to push the piston rods 38a out of the casings of the cylinders and move the movable columns 28 farther from the fixed columns 26. If, on the other hand, the movable columns 28 are too far away from the fixed columns 26 for the width of the crates to be handled, the plunger of the selected direction switch will not be depressed, so that the "together" solenoid 332 will be energized and the valve 336 (FIGURE 15) actuated to supply pressure fluid to the other ends of the cylinders 38 (see also FIGURE 1), retracting the piston rods 38a and moving the columns 28 closer to the columns 26.

As may be seen in FIGURE 15, check valves 338 are provided at various points in the hydraulic circuit to insure uni-directional flow of the hydraulic fluid, and flow control valves 340 are provided to insure movement of the piston rods of certain of the cylinders at uniform rates.

As best shown in FIGURE 9, the switch actuating rod 318 is provided with grooves 318a at either side at points opposite the rollers of the position switches 296. These grooves 318a extend the full length of the portion of the switch actuating rod 318 which comes into engagement with the switch rollers, except that at the outer end of the switch actuating rod 318 there is a cap plate 318b (FIGURE 8) which extends for the full width of the switch actuating rod 318. When this cap plate 318b engages the roller of one of the position switches 296 it depresses the plunger of the switch.

As may be seen in FIGURE 14, depressing the particular position switch 296 which has been selected by the lower section 294f of the selector switch 294, breaks the circuit to the relay 298, de-energizing the relay and opening its contacts 298a and closing its contacts 298b. The opening of the contacts 298a breaks the holding circuit to the relay 298 and also breaks the circuit to the particular directional switches 308 which has been selected by the second-from-bottom section 294e of the selector switch, thereby de-energizing the solenoid 332 or 334 which has been energized, allowing the valve 336 (FIGURE 15) to return to its neutral center position, shutting off the supply of pressure fluid to the hydraulic cylinders 38 and stopping the movement of the movable columns 28. The closure of the relay contacts 298b (FIGURE 14) re-energizes the solenoid 302 (FIGURE 15), moving the valve 304 again to the position shown in FIGURE 15 and supplying pressure fluid to the hydraulic cylinders 58 (see also, FIGURE 1) to apply the brakes 44 and lock the movable columns 28 in their new position.

From the foregoing description, it will be understood that when the selector switch 294 is set to a predetermined box size and the change switch 309 is depressed, the movable columns 28 are moved toward or away from the fixed columns 26 by the amount necessary to accommodate the width of the crate which has been selected. Simultaneously, the movable upper guideways 64 (FIGURE 3) are moved up or down to the proper position to accommodate the height of the particular crate selected. The difference in depth of the various crates handled in the machine is accommodated by movement of the support members 86 (FIGURES 2 and 3) during the initial part of the operating cycle of the machine, as previously described.

It will thus be appreciated that the present invention provides a box-closing machine by which the aforementioned and other desirable objectives have been achieved. However, it should be emphasized that the particular embodiment of the invention which is shown in the accompanying drawings and described in the foregoing specification, is intended as merely illustrative of the principles of the invention, rather than as restrictive of the scope thereof or of the coverage of this patent, which is limited only by the appended claims.

What is claimed is:

1. In a machine for closing wirebound boxes of the type wherein the box ends are provided with battens adjacent their edges and the edges of the box sides abut the outer faces of said battens, a frame for receiving and supporting the boxes with the box ends in place but unsecured and with the loop fasteners at the closing corner of the box threaded but not interlocked, fixed clamp members mounted on said frame near the input end of said machine in the path of the box moving into the machine, said fixed clamp members being mounted for movement laterally from the path of an oncoming box by engagement with the box to permit the box to pass, resilient means urging said fixed clamp members to return to their position in the path of said box after passage thereof, movable clamp members mounted on said frame for movement against the leading face of the box to move said box in a reverse direction against said fixed clamp members to forcibly engage the box between said clamp members, square its corners and hold it in predetermined position in said frame, a plurality of stapling mechanisms mounted on said frame for driving staples through the box sides and into the battens on the box ends, a loop bending member mounted on said frame for movement around the closing corner of the box to bend the threaded loops into interlocked position, and two-way-acting power means for driving said movable clamp members, said stapling mechanisms and said loop bending member to perform the aforesaid operations in predetermined sequence.

2. In a machine for closing wirebound boxes of the type wherein the box ends are provided with battens adjacent their edges and the edges of the box sides abut the outer faces of said battens, a frame for receiving and supporting the boxes with the box ends in place but unsecured and with the loop fasteners at the closing corner of the box threaded but not interlocked, fixed clamp members mounted on said frame near the input end of said machine in the path of the box moving into the machine, said fixed clamp members being mounted for movement laterally from the path of an oncoming box by engagement with the box to permit the box to pass, resilient means urging said fixed clamp members to return to their position in the path of said box after passage thereof, supporting assemblies mounted on said frame for movement in a fore-and-aft direction, movable clamp members pivotally mounted on said supporting assemblies, spring means urging said movable clamp members to pivot outwardly into position to engage the leading face of the box upon the movement of said supporting assemblies toward the input end of said machine, whereby upon such movement of said supporting assemblies the box will be engaged and moved in a reverse direction against said fixed clamp members, cam means mounted on said frame for engaging said movable clamp members upon the movement of said supporting assemblies toward the output end of the machine and camming said movable clamp members out of the path of the box during its movement out of said machine, stapling mechanisms respectively mounted on said supporting assemblies for driving staples through the box sides and into the battens on said box ends, a loop bending member mounted on said frame for movement around the closing corner of the box to bend the threaded loops into interlocked position, and power means for driving said supporting assemblies, said stapling mechanisms and said loop bending member to perform the aforesaid operations in predetermined sequence.

3. In a machine for closing wirebound boxes of the type wherein the box ends are provided with battens adjacent their edges and the edges of the box sides abut the outer faces of said battens, a frame for receiving and supporting the boxes with the box ends in place but unsecured and with the loop fasteners at the closing corner of the box threaded but not interlocked, fixed clamp members mounted on said frame near the input end of said machine in the path of the box moving into the machine, said fixed clamp members being mounted for movement laterally from the path of an oncoming box by engagement with the box to permit the box to pass, resilient means urging said fixed clamp members to return to their position in the path of said box after passage thereof, movable clamp members mounted on said frame for movement against the leading face of the box to move said box in a reverse direction against said fixed clamp members, fluid pressure cylinder means mechanically connected to said movable clamp members for moving the same toward said fixed clamp members, valve means for controlling the supply of pressure fluid to said cylinder means, control means for said valve means, said control means being positioned for actuation by a box upon its arrival in position to be operated upon by said machine, a plurality of stapling mechanisms mounted on said frame for driving staples through the box sides and into the battens on the box ends, a loop bending member mounted on said frame for movement around the closing corner of the box to bend the threaded loops into interlocked position, and power means for driving said stapling mechanisms and said loop bending member to perform the aforesaid operations in predetermined sequence.

4. In a machine for closing wirebound boxes of the type wherein the box ends are provided with externally exposed battens adjacent their edges and the edges of the box sides abut the outer faces of said battens, a frame for receiving and supporting the boxes with the box ends in place but unsecured and with the loop fasteners at the closing corner of the box threaded but not interlocked, cooperating clamp members mounted on said frame for movement relative to each other to engage opposite faces of the box and hold it stationary in said frame, a plurality of supporting assemblies adjustably mounted on said frame, a stapling mechanism mounted on each of said supporting assemblies and having a movable staple driver for driving staples through the box sides and into the outer faces of the battens on said box ends, a support hook mounted on each of said supporting assemblies for movement inwardly toward the box end and outwardly against the inner faces of the battens thereon to support the battens during the driving of said staples, a single fluid pressure cylinder mounted on each of said supporting assemblies with its casing and piston rod connected between said staple driver and said support hook whereby said cylinder causes said staple driver and said support hook to exert substantially equal forces at opposite sides of the batten, a loop bending member mounted on said frame for movement around the closing corner of the box to bend the threaded loops into interlocked position, and power means for driving said clamp members and said loop bending member to perform their aforesaid operations in the order named, and means for supplying fluid under pressure to said fluid pressure cylinder at a predetermined point in such cycle of operations.

5. In a machine for closing wirebound boxes of the type wherein the box ends are provided with externally exposed battens adjacent their edges and the edges of the box sides abut the outer faces of said battens, a frame for receiving and supporting the boxes with the box ends in place but unsecured and with the loop fasteners at the closing corner of the box threaded but not interlocked, cooperating clamp members mounted on said frame for movement relative to each other to engage opposite faces of the box and hold it stationary in said frame, a plurality of supporting assemblies adjustably mounted on said frame, a stapling mechanism mounted on each of said supporting assemblies having a movable staple driver for driving staples through the box sides and into the outer faces of the battens on the box ends, a batten positioning and supporting hook mounted on each of said supporting assemblies for movement toward and away from the box sides and for movement generally perpendicularly thereto toward and away from the box end, and cam means on each of said supporting assemblies for converting the motion of said hook away from the side of the box into a resultant motion including a component directed inwardly toward the box end whereby said hook will press down the box end and engage the inner face of the adjacent batten thereon to support said batten during the driving of staples thereinto, a single fluid pressure cylinder mounted on each of said supporting assemblies with its casing and piston rod connected between said staple driver and said support hook whereby said cylinder causes said staple driver and said support hook to exert substantially equal forces at opposite sides of the batten, a loop bending member mounted on said frame for movement around the closing corner of the box to bend the threaded loops into interlocked position, power means for driving said clamp members and said loop bending member to perform their aforesaid operations in the order named, and means for supplying fluid under pressure to said fluid pressure cylinder at a predetermined point in such cycle of operations.

6. A machine as claimed in claim 5 wherein the supporting assemblies at one end of the box are spring mounted for limited movement in a direction perpendicular to the box end to accommodate boxes of slightly different overall length.

7. In a machine for closing wirebound boxes of the type wherein the box ends are provided with externally exposed battens adjacent their edges and the edges of the box sides abut the outer faces of said battens, a frame for receiving and supporting the boxes with the box ends in place but unsecured and with the loop fasteners at the closing corner of the box threaded but not interlocked, fixed clamp members mounted on said frame near the input end of said machine in the path of the box moving into the machine, said fixed clamp members being mounted for movement laterally from the path of an oncoming box by engagement with the box to permit the box to pass, resilient means urging said fixed clamp members to return to their position in the path of said box after passage thereof, movable clamp members mounted on said frame for movement against the leading face of the box to move said box in a reverse direction against said fixed clamp members, fluid pressure cylinder and piston means mechanically connected to said movable clamp members for moving the same toward said fixed clamp members, valve means for controlling the supply of pressure fluid to said cylinder means, control means for said valve means, said control means being positioned for actuation by a box upon its arrival in position to be operated upon in said machine, a plurality of support assemblies movably mounted on said frame and mechanically linked to said movable clamp members for movement therewith to predetermined positions adjacent the edges of the box sides, a stapling mechanism mounted on each of said supporting assemblies and having a movable staple driver for driving staples through the box sides and into the outer faces of the battens on said box ends, a support hook mounted on each of said supporting assemblies for movement inwardly toward the box end and outwardly against the inner faces of the battens thereon to support said battens during the driving of said staples, a single fluid pressure cylinder mounted on each of said supporting assemblies with its casing and piston rod connected between said staple driver and said support hook whereby said cylinder causes said staple driver and said support hook to exert substantially equal forces at opposite sides of the batten, a loop bending member mounted on said frame for movement around the closing corner of the box to bend the threaded loops into interlocked position, and means for supplying fluid under pressure to said fluid pressure cylinders to cause them to perform their aforesaid operations in the order named, and power means for driving said loop bending member at a predetermined point in such cycle of operation.

8. In a machine for closing wirebound boxes of the type wherein the box ends are provided with battens adjacent their edges and the edges of the box sides abut the outer faces of said battens, a frame for receiving and supporting the boxes with the box ends in place but unsecured and with the loop fasteners at the closing corner of the box threaded but not interlocked, cooperating clamp members mounted on said frame for movement relative to each other to engage opposite faces of the box and hold it stationary in said frame, a plurality of stapling mechanisms mounted on said frame for driving staples through the box sides and into the battens on the box ends, a loop bending member mounted on said frame for movement around the closing corner of the box to bend the threaded loops into interlocked position, first power means connected to drive said clamp members, first control means arranged to control said first power means and to be actuated by a box arriving in proper position to be operated upon in said machine to cause said clamp members to engage and hold said box, second power means connected to drive said stapling mechanisms, second control means arranged to control said second power means and to be actuated by movement of said clamp members into box-holding position to cause said stapling mechanisms to drive staples as aforesaid, third power means connected to drive said loop bending member, third control means arranged to control said third power means and to be actuated by operation of said stapling mechanisms to cause said loop bending member to bend said loop fasteners as aforesaid, fourth control means also arranged to control said first, second and third power means and to be actuated upon completion of the loop bending stroke of said loop bending member to cause said clamp members, said stapling mechanism and said loop bending member to be retracted from engagement with said box.

9. In a machine for closing wirebound boxes of the type wherein the box ends are provided with battens adjacent their edges and the edges of the box sides abut the outer faces of said battens, a frame for receiving and supporting the boxes with the box ends in place but unsecured and with the loop fasteners at the closing corner of the box threaded but not interlocked, cooperating clamp members mounted on said frame for movement relative to each other to engage opposite faces of the box and hold it stationary in said frame, a plurality of stapling mechanisms mounted on said frame for driving staples through the box sides and into the battens on the box ends, a loop bending member mounted on said frame for movement around the closing corner of the box to bend the threaded loops into interlocked position, first power means connected to drive said clamp members, first control means arranged to control said first power means and to be actuated by a box arriving in proper position to be operated upon in said machine to cause said clamp members to engage and hold said box, second power means connected to drive said stapling mechanisms, second control means arranged to control said second power means and to be actuated by movement of said clamp members into box-holding position to cause said stapling mechanisms to drive staples as aforesaid, third power means connected to drive said loop bending member, third control means arranged to control said third power means and to be actuated by operation of said stapling mechanisms to cause said loop bending member to bend said loop fasteners as aforesaid, an ejector member movably mounted on said frame for engaging the box and moving it out of said machine, fourth power means for driving said ejector member, and fourth control means arranged to control said first, second, third and fourth power means and to be actuated upon completion of the loop bending stroke of said loop bending member to cause said clamp members, said stapling mechanism and said loop bending member to be retracted from engagement with said box and to cause said ejector member to move said box out of said machine.

10. In a machine for closing wirebound boxes of the type wherein the box ends are provided with battens adjacent their edges and the edges of the box sides abut the outer faces of said battens, a frame for receiving and supporting the boxes with the box ends in place but unsecured and with the loop fasteners at the closing corner of the box threaded but not interlocked, cooperating clamp members mounted on said frame for movement relative to each other to engage opposite faces of the box and hold it stationary in said frame, a plurality of stapling mechanisms mounted on said frame for driving staples through the box sides and into the battens on the box ends, a loop bending member mounted on said frame for movement around the closing corner of the box to bend the threaded loops into interlocked position, an ejector member movably mounted on said frame for engaging the box and moving it out of said machine, a pump for pressurizing fluid, an electrically controlled motor for driving said pump, a first electrical switch for controlling said motor, said switch being arranged to be actuated to start said pump by the approach into said machine of a box to be operated upon, a first set of fluid pressure cylinders and pistons connected to drive said clamp members, a first electrically controlled valve connected to control the flow of pressure fluid from said pump to said first set of cylinders, a second electrical switch connected to control said first valve and arranged to be actuated by the arrival of said box into proper position to be operated upon to cause movement of said clamp members as aforesaid, a second set of fluid pressure cylinders and pistons connected to drive said stapling mechanisms, a second electrically controlled valve connected to control the flow of pressure fluid from said pump to said second set of cylinders, a third electrical switch connected to control said second valve and arranged to be actuated to cause said stapling mechanisms to drive staples by the movement of said clamp members into box-holding position, a third fluid pressure cylinder and piston connected to drive said loop bending member, an electrically controlled valve for controlling the flow of pressure fluid from said pump to said third cylinder, a fourth electrical switch connected to control said third valve and arranged to be actuated by the operation of said stapling mechanisms to cause said loop bending member to bend the loops on the box, a fourth fluid pressure cylinder and piston connected to drive said ejector member, a fourth electrically controlled valve for controlling the flow of pressure fluid from said pump to said fourth cylinder, a fifth electrical switch arranged to be actuated upon completion of the loop bending stroke of said loop bending member and connected to control said first, second, third and fourth valves to cause said clamp members, said stapling members and said loop bending member to be retracted from engagement with said box and to cause said ejector member to move said box out of said machine, and a sixth electrical switch connected to control said motor and arranged to be actuated to stop said pump by movement of said ejector member to box-ejecting position.

11. In a machine for closing wirebound boxes of the type wherein the box ends are provided with battens adjacent their edges and the edges of the box sides abut the outer faces of said battens, a base including a support for said boxes, a pair of upstanding columns supported on said base at opposite sides of said support, at least one of said columns being movable toward and away from the other to accommodate between them boxes of different transverse dimensions, upper and lower horizontal guideways mounted on each of said columns for relative vertical movement towards and away from each other to accommodate boxes of different vertical dimensions, supporting assemblies mounted on each of said guideways for movement along the same to accommodate boxes of different fore-and-aft dimensions, power means connected to the movable column, to said guideways and said supporting assemblies for movement thereof as aforesaid, two sets of adjustably positioned control means, one each for said movable column and said guideways, selector means for rendering a selected one of the control means in each of said sets operative to control the respective power means, operating means respectively movable with said movable column and said guideways for operating said control means at positions varying in accordance with the dimensions of the box to be accommodated in said machine, clamp members on at least some of said supporting assemblies for engaging the box and holding the same in position on said support, stapling mechanisms respectively mounted on at least some of said supporting assemblies for driving staples through the box sides and into said battens, a loop bending member mounted on one of said columns for movement around the closing corner of the box to bend the threaded loops into interlocked position, and power means for driving said supporting assemblies, said stapling mechanisms and said loop bending member to perform the aforesaid operations in predetermined sequence.

12. In a machine for closing wirebound boxes of the type wherein the box ends are provided with battens adjacent their edges and the edges of the box sides abut the outer faces of said battens, a supporting frame, a pair of upstanding columns provided at their proximate sides with box supporting means, at least one of said columns being movable on said frame, toward and away from the other to accommodate between them boxes of different transverse dimensions, a first fluid pressure cylinder and piston connected between said frame and said movable column for movement of said movable column toward and away from said other column upper and lower horizontal guideways mounted on each of said columns, at least one of said guideways being mounted for vertical movement towards and away from the other to accommodate boxes of different vertical dimensions, a plurality of second fluid pressure cylinders and pistons respectively connected between one of said movable guideways and its respective column for movement of said movable guideway toward and away from said other guideway, supporting assemblies mounted on each of said guideways for movement along the same to accommodate boxes of different fore-and-aft dimensions, a plurality of third fluid pressure cylinders and pistons each respectively connected between one of said supporting assemblies and its respective guideway for movement of said supporting assembly along said guideway, electrically controlled valves for respectively controlling the supply of pressure fluid to said first and second fluid pressure cylinders, switch operating elements respectively movable with said movable column and said guideways, two sets of electrical switches positioned for respective actuation by said switch operating elements at different points in their movement in accordance with the dimensions of various types of boxes to be accommodated in said machine, selector switch means for connecting a single one of each of said two sets of switches for respective control of said electrically controlled valves, movable clamp members on at least some of said supporting assemblies for engaging the box and pressing the box against opposed fixed clamp members on the forward columns to hold the box in position on said supporting means, stapling mechanisms respectively mounted on at least some of said supporting assemblies for driving staples through the box sides and into said battens, a plurality of fourth fluid pressure cylinders and pistons respectively connected between said supporting assemblies and said stapling mechanisms for actuating said stapling mechanisms, a loop bending member mounted on one of said columns for movement around the closing corner of the box to bend the threaded loops into interlocked position, a fifth fluid pressure cylinder and piston connected to said loop bending member, and valve means for supplying fluid under pressure to said third, fourth and fifth fluid pressure cylinders for driving said supporting assemblies, said stapling mechanisms and said loop bending member to perform the aforesaid operations in predetermined sequence.

13. In a machine for closing wirebound boxes of the type wherein the box ends are provided with battens adjacent their edges and the edges of the box sides abut the outer faces of said battens, a supporting frame, a pair of upstanding columns provided at their proximate sides with box supporting means, at least one of said columns being movable on said frame, toward and away from the other to accommodate between them boxes of different transverse dimensions, a first fluid pressure cylinder and piston connected between said frame and said movable column for movement of said movable column toward and away from said other column upper and lower horizontal guideways mounted on each of said columns, at least one of said guideways being mounted for vertical movement towards and away from the other to accommodate boxes of different vertical dimensions, a plurality of second fluid pressure cylinders and pistons respectively connected between one of said movable guideways and its respective column for movement of said movable guideway toward and away from said other guideway, supporting assemblies mounted on each of said guideways for movement along the same to accommodate boxes of different fore-and-aft dimensions, a plurality of third fluid pressure cylinders and pistons each respectively connected between one of said supporting assemblies and its respective guideway for movement of said supporting assembly along said guideway, a first set of electrically controlled on-off valves for respectively controlling the supply of pressure fluid to said first and second fluid pressue cylinders, a second set of electrically controlled directional valves for respectively directing said pressure fluid to one end or the other of said cylinders, swich operating rods respectively movable with said movable column and said guideways, two sets of pairs of electrical switches positioned for respective actuation by said rods at various points in their movement, and selector switch means for selectively connecting one pair of switches in each of said sets so that one of the switches in each selected pair controls the on-off valve and the other controls the directional valve for one of said cylinders whereby said cylinders cause said movable columns and said guideways to move in the appropriate direction to a predetermined position in accordance with the size of box to be handled in the machine, movable clamp members on at least some of said supporting assemblies for engaging the box and pressing the box against opposed fixed clamp members on the forward column to hold the box in position on said supporting means, stapling mechanisms respectively mounted on at least some of said supporting assemblies for driving staples through the box sides and into said battens, a plurality of fourth fluid pressure cylinders and pistons respectively connected between said supporting assemblies and said stapling mechanisms for actuating said stapling mechanisms, a loop bending member mounted on one of said columns for movement around the closing corner of the box to bend the threaded loops into interlocked position, a fifth fluid pressure cylinder and piston connected to said loop bending member, and power means for driving said supporting assemblies, said stapling mechanisms and said loop bending member to perform the aforesaid operations in predetermined sequence.

References Cited in the file of this patent

UNITED STATES PATENTS

| | | |
|---|---|---|
| 1,963,377 | Paxton | June 19, 1934 |
| 2,004,355 | Twomley | June 11, 1935 |
| 2,063,124 | Rosenmund | Dec. 8, 1936 |
| 2,723,393 | Verrinder et al. | Nov. 15, 1955 |
| 2,772,415 | Jenny | Dec. 4, 1956 |
| 2,777,126 | Muller | Jan. 15, 1957 |